(12) United States Patent
Jang

(10) Patent No.: US 7,918,494 B2
(45) Date of Patent: Apr. 5, 2011

(54) ASSEMBLY TYPE COWL TOP COVER

(75) Inventor: Kwang Yong Jang, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 196 days.

(21) Appl. No.: 12/238,658

(22) Filed: Sep. 26, 2008

(65) Prior Publication Data

US 2009/0152897 A1    Jun. 18, 2009

(30) Foreign Application Priority Data

Dec. 14, 2007   (KR) .................. 10-2007-0131007

(51) Int. Cl.
*B62D 39/00* (2006.01)
(52) U.S. Cl. .................................... 296/192
(58) Field of Classification Search ............ 296/192, 296/201, 208, 96.21, 96.22, 29, 84.1, 93, 296/1.07, 1.08
See application file for complete search history.

(56) References Cited

U.S. PATENT DOCUMENTS

| | | | | |
|---|---|---|---|---|
| 4,912,895 A * | 4/1990 | Harris, Jr. | ...................... | 52/208 |
| 4,921,297 A * | 5/1990 | Stevens | ...................... | 296/96.21 |
| 5,013,077 A * | 5/1991 | Stevens | ...................... | 296/96.21 |
| 5,531,496 A * | 7/1996 | Zbinden et al. | ............ | 296/96.21 |
| 6,151,847 A * | 11/2000 | Okuniewicz et al. | .... | 52/204.591 |
| 6,957,849 B2 * | 10/2005 | Eloian et al. | .................. | 296/201 |
| 7,147,274 B2 * | 12/2006 | Yamamoto | ..................... | 296/201 |
| 7,316,448 B2 * | 1/2008 | Koyama et al. | ............... | 296/192 |

FOREIGN PATENT DOCUMENTS

| | | |
|---|---|---|
| JP | 2006-281922 A | 10/2006 |
| KR | 20-0140757 | 12/1998 |
| KR | 10-2003-0008935 A | 1/2003 |

\* cited by examiner

*Primary Examiner* — Lori L Lyjak
(74) *Attorney, Agent, or Firm* — Morgan, Lewis & Bockius LLP

(57) ABSTRACT

An assembly type cowl top cover for covering a cowl groove defined between a hood and windshield glass. The assembly type cowl top cover includes a cover body having one end which is coupled to a vehicle body adjacent to the hood; and a plurality of fastening hooks detachably coupled to the other end of the cover body at regular intervals to support the windshield glass from beneath.

5 Claims, 3 Drawing Sheets

[FIG 1A]
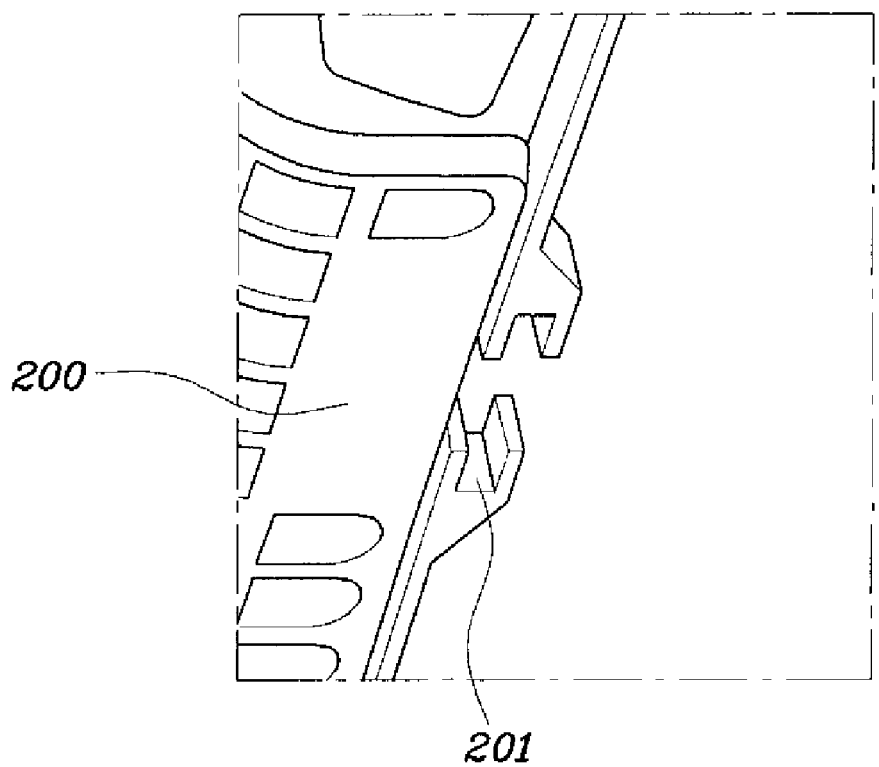
[FIG 1B]
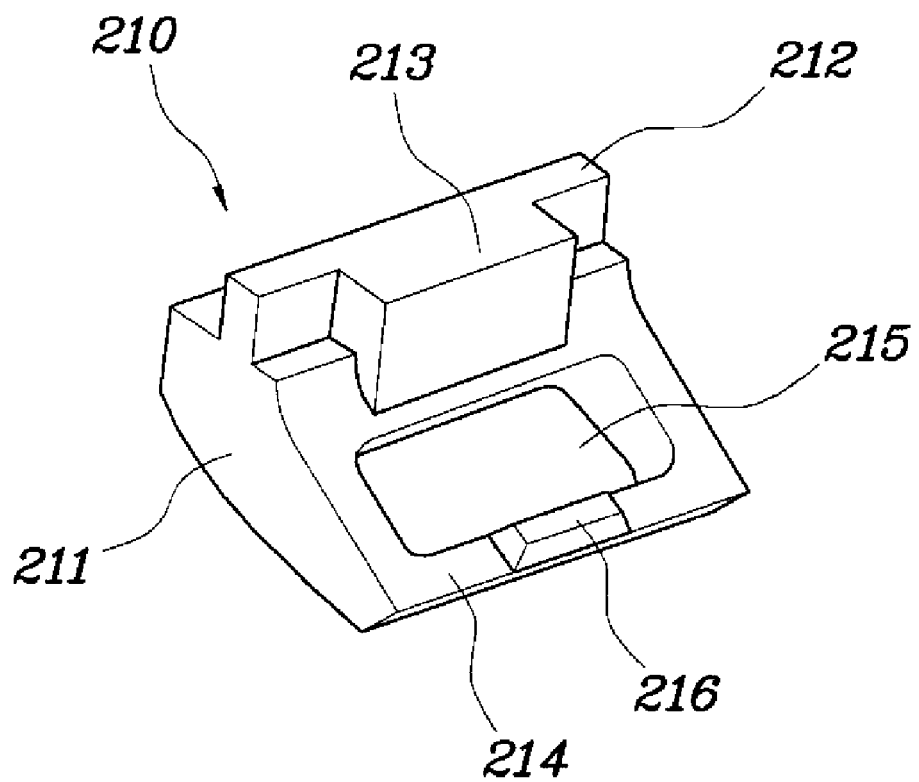

[FIG] 2
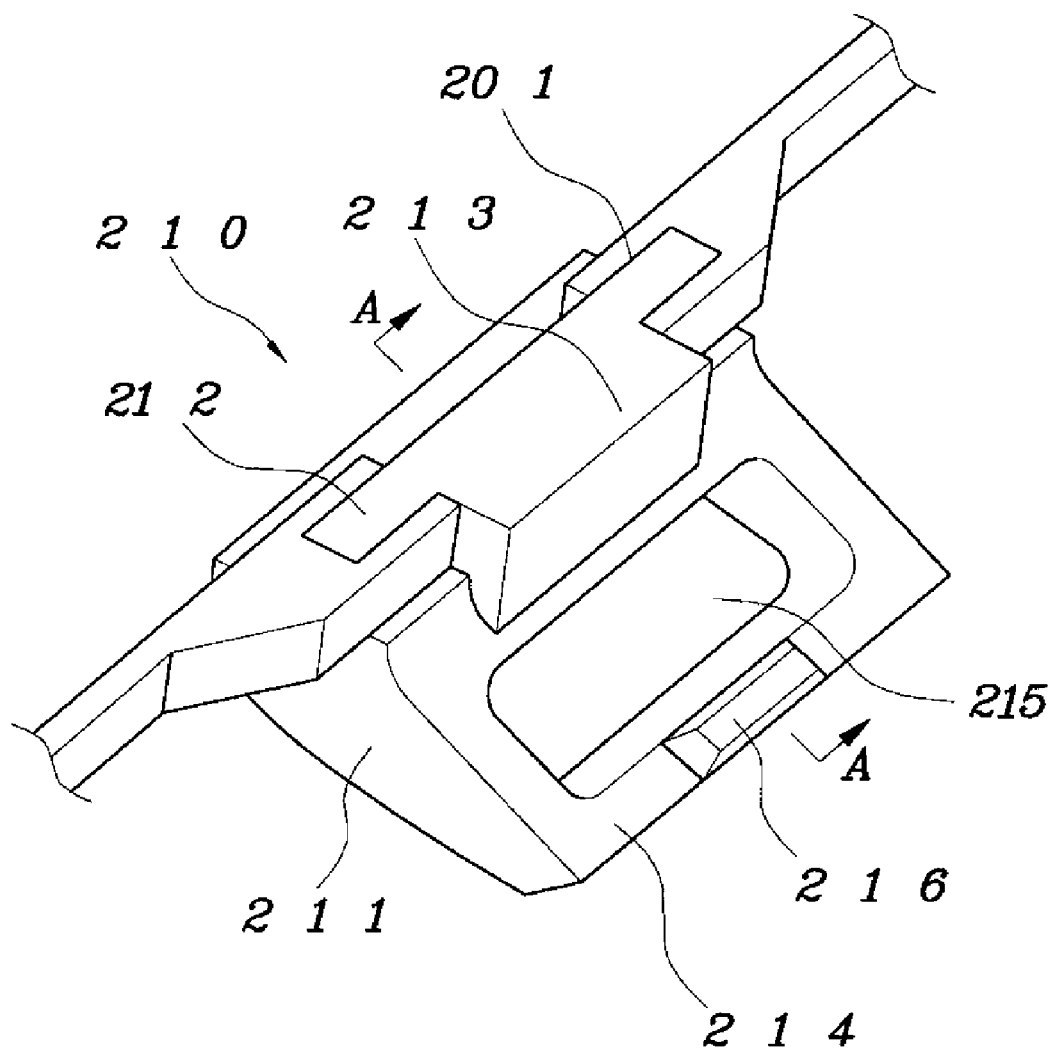

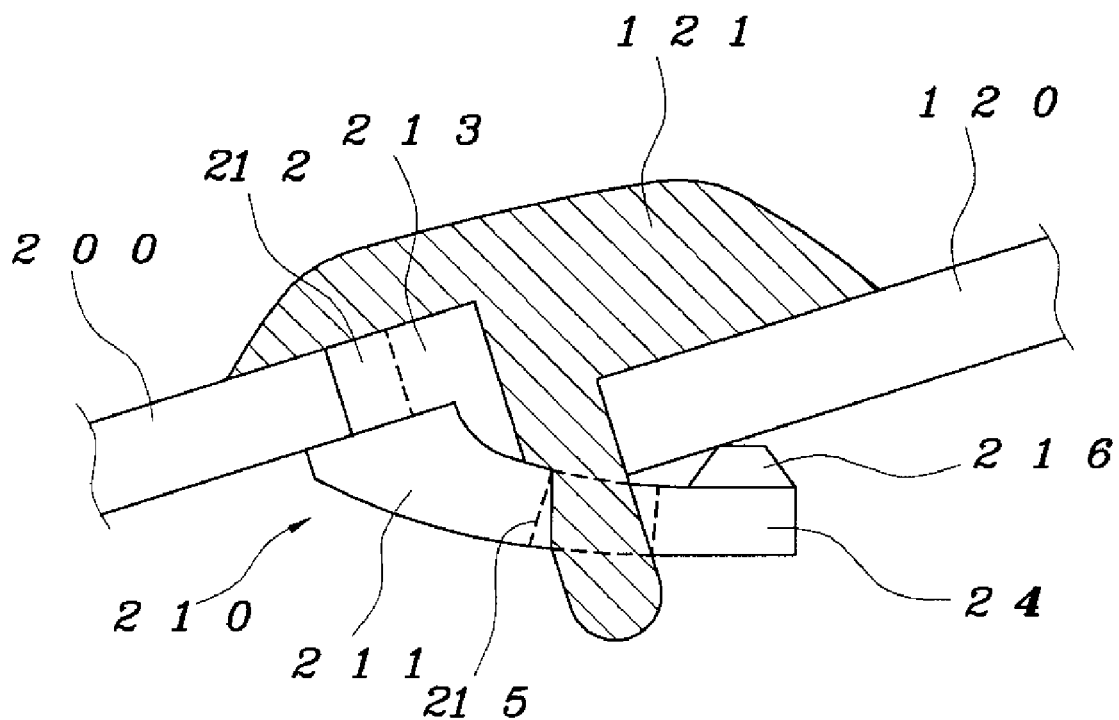
[FIG] 3

ASSEMBLY TYPE COWL TOP COVER

CROSS-REFERENCE TO RELATED APPLICATIONS

This application claims priority to Korean Application No. 10-2007-0131007, filed on Dec. 14, 2007, the disclosure of which is incorporated herein by reference.

BACKGROUND OF THE INVENTION (1) Field of the Invention

The present invention relates to a cowl top cover. More particularly, the present invention relates to a cowl top cover which is provided to cover the cowl groove defined between a hood and a windshield glass.

(2) Description of the Prior Art

As is generally known in the art, a cowl groove is defined between a hood and a windshield glass of a vehicle. A cowl top cover is provided to cover the cowl groove.

In a conventional integral type cowl top cover, the cowl top cover has fastening hooks formed integrally at one end thereof. Each fastening hook has a hook part which extends toward the end of a windshield glass. An insertion hole is defined in the hook part such that a weather strip can be fitted through the insertion hole.

The cowl top cover covers a cowl groove due to the fact that the other end thereof is attached to a cowl under panel adjacent to a hood and one end thereof supports the windshield glass. A weather strip is provided adjacent to the other end of the cowl top cover to perform a waterproofing function between the hood and the cowl top cover and the weather strip is fitted through one end of the cowl top cover to ensure water-tightness between the cowl top cover and the windshield glass. The windshield glass is stably supported between the hook parts of the fastening hooks and the weather strip.

The hook parts must be formed to be inclined with respect to the windshield glass. In order to form the hook parts integrally with the cowl top cover such that they are inclined with respect to the windshield glass, a separate side mold must necessarily be installed such that the side mold can be moved for forming the cowl top cover. Therefore, a problem is caused in that the overall size of the mold for forming the cowl top cover increases.

As the size of the mold increases, the shape of the mold becomes complicated and the mold fabrication time and cost increase. Further, due to the complexity in the structure of the mold, it is difficult to properly conduct work for modifying the mold. Moreover, separate molds must be fabricated for respective kinds of vehicles, thereby increasing manufacturing costs.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, embodiments of the present invention provides an assembly type cowl top cover, in which a fastening hook for coupling a windshield glass and a cowl top cover with each other is formed as a separate part and is assembled to the cowl top cover so that the size of a mold for forming the cowl top cover can be decreased.

In order to achieve the above object, according to one aspect of the present invention, there is provided an assembly type cowl top cover for covering a cowl groove defined between a hood and windshield glass, comprising a cover body having one end which is coupled to a vehicle body adjacent to the hood; and at least a fastening hook detachably coupled to the other end of the cover body at predetermined intervals to support the windshield glass from beneath. The predetermined intervals may be regular.

According to another aspect of the present invention, at least a groove is defined on the other end of the cover body, and the at least a fastening hook comprise a body, a projection, formed on upper portion of the body to be fitted into the at least a groove, to support the windshield glass from beneath; and a hook part formed at a distal end portion of the body.

According to another aspect of the present invention, insertion hole is defined in the respective body and the hook part such that a portion of a weather strip can be fitted into the insertion holes to perform a waterproofing function between the cover body and the windshield glass.

According to still another aspect of the present invention, the projections and the at least a groove are formed to have a rectangular sectional shape so as to ensure stable engagement between the cover body and the fastening hook, and hook protrusion is formed on upper portion of the hook part to contact with a lower surface of the windshield glass.

According to a still further aspect of the present invention, support protuberance is formed on the upper portion of the body of the fastening hook and extending from projection toward the windshield glass so as to support the weather strip.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein:

FIG. 1A is a bottom perspective view illustrating a cover body of an assembly type cowl top cover in accordance with one embodiment of the present invention;

FIG. 1B is a perspective view illustrating a fastening hook of the assembly type cowl top cover in accordance with the one embodiment of the present invention;

FIG. 2 is a perspective view illustrating the state in which the cover body and the fastening hook shown in FIGS. 1A and 1B are assembled with each other; and FIG. 3 is a cross-sectional view taken along the line A-A of FIG. 2 after a weather strip is inserted in the state shown in FIG. 2.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF A PREFERRED EMBODIMENT

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Referring to FIGS. 1A and 1B, and FIG. 2, an assembly type cowl top cover in accordance with one embodiment of the present invention is formed to cover the cowl groove defined between a hood (not shown) and a windshield glass 120.

The assembly type cowl top cover includes a cover body 200, one end of which is positioned adjacent to the rear end of the hood, and a plurality of fastening hooks 210, which are coupled to the other end of the cover body 200 at regular intervals and support the windshield glass 120 from beneath.

Groove 201 are defined on the other end of the cover body 200. The fastening hooks 210 comprises bodies 211, hook parts 214, and projections 212 formed on the upper portion of the bodies 211 such that the projections 212 can be fitted into and securely locked in the respective grooves 201 of the cover body 200. Preferably, the hook parts 214 are formed on the lower end of the bodies 211 to support the windshield glass 120 from beneath.

Preferably, the projection 212 and the grooves 201 are formed to have a rectangular sectional shape so that the cover body 200 and the fastening hooks 210 are prevented from being unintentionally released from each other after they are engaged with each other. A support protuberance 213 is projectedly formed on the body 211 and extends integrally from the projection 212 to support a weather strip 121 from front.

Referring to FIG. 3, the support protuberance 213 projects from the projection 212 toward the windshield glass 120 and has a substantially quadrangular shape. The support protuberance 213 functions to support the weather strip 121 from front. The weather strip 121 is stably and securely held between the windshield glass 120 and the support protuberances 213 of the fastening hooks 210. The projection 212, which has a rectangular sectional shape, is press-fitted into the groove 201 so that the projection 212 does not wobble back and forth and can absorb shocks. Consequently, the coupled state of the cover body 200, the fastening hooks 210 and the windshield glass 120 can be stably maintained.

The hook part 214 for supporting the windshield glass 120 from beneath integrally extends from the body 211 and a hook protrusion 216 is formed on an upper portion of the distal end of the hook part 214 to prevent slippage of the windshield glass 120. An insertion hole 215 is defined in the body 211 such that a lower portion of the weather strip 121 can be fitted into the insertion hole 215.

The assembly of the cowl top cover according to the present invention, constructed as mentioned above, will be described below.

First, the fastening hooks 210 are coupled to the rear end of the cover body 200, by press-fitting the projections 212 of the fastening hooks 210 into the grooves 201 defined in the cover body 200. Due to the fact that the grooves 201 and the projections 212 have the rectangular sectional shape, the fastening hooks 210 are prevented from wobbling back and forth, and the assembly tolerance can be decreased to the minimum. With the cover body 200 and the fastening hooks 210 completely coupled with each other in this way, the fastening hooks 210 are kept secure with respect to the other end of the cover body 200 while projecting rearward. At this time, the hook parts 214 formed on the fastening hooks 210 are positioned to be at an incline with respect to the cover body 200.

In this state, the windshield glass 120 is assembled to the fastening hooks 210 in a manner such that the weather strip 121 adheres to the upper surfaces of the cover body 200 and the windshield glass 120 and is fitted into the insertion holes 215 of the fastening hooks 210.

Accordingly, in the present invention since the cover body 200 and the fastening hooks 210 are formed separately from each other and the fastening hooks 210 are then coupled to the rear end of the cover body 200, the structure of a mold for forming the cowl top cover can be simplified, and the size of the mold can be decreased.

Further, since the fastening hook 210 is formed as a separate part, the mold can be conveniently modified, and the standardization of a fastening hook is made possible, so that the fastening hook can be commonly applied to all kinds of vehicles. Further, since the structure of the mold is simplified, the assembly tolerance can be decreased and the outer appearance of the windshield glass 120 can be improved.

As is apparent from the above description, the assembly type cowl top cover according to the present invention confers advantages in that, since a fastening hook, which is arranged at a connection region between a windshield glass and a cowl top cover, is formed as a part which is separate from a cover body, the structure of a mold for forming the cowl top cover can be simplified, and the mold fabrication cost can be reduced.

Also, in the present invention, because the same fastening hook can be commonly used for the cowl top covers of various kinds of vehicles, manufacturing costs can be reduced, and because molds for respectively forming the cover body and the fastening hook are separately provided, the molds can be quickly and conveniently modified.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An assembly type cowl top cover for covering a cowl groove defined between a hood and windshield glass, comprising:
    a cover body having one end coupled to a vehicle body adjacent to the hood; and
    at least a fastening hook detachably coupled to the other end of the cover body at predetermined intervals and supporting the windshield glass from beneath, wherein at least a groove are defined in the other end of the cover body, and the at least a fastening hook comprise:
    a body;
    a projection formed on upper portion of the body, to be fitted into the at least a groove, to support the windshield glass from beneath; and
    a hook part formed at a distal end portion of the body.

2. The cowl top cover according to claim 1, wherein the predetermined intervals of fastening hooks are regular.

3. The cowl top cover according to claim 1, wherein insertion hole is defined in the respective body and the hook part such that a portion of a weather strip can be fitted into the insertion holes to perform a waterproofing function between the cover body and the windshield glass.

4. The cowl top cover according to claim 1, wherein projection and the at least a groove are formed to have a rectangular sectional shape so as to ensure stable engagement between the cover body and the fastening hook and hook protrusion is formed on upper portion of the hook part to contact with a lower surface of the windshield glass.

5. The cowl top cover according to claim 4, wherein support protuberance is formed on the upper portion of the body of the fastening hook and extending from projection toward the windshield glass so as to support the weather strip.

* * * * *